United States Patent [19]

Franco, Jr.

[11] Patent Number: 5,317,914
[45] Date of Patent: Jun. 7, 1994

[54] HARDENED DATA ACQUISITION SYSTEM

[75] Inventor: Raphael A. Franco, Jr., Vicksburg, Miss.

[73] Assignee: The United States of America as represented by the Secretary of the Army, Washington, D.C.

[21] Appl. No.: 695,138

[22] Filed: May 3, 1991

[51] Int. Cl.$^5$ ................................................ G01L 1/00
[52] U.S. Cl. ...................................... 73/167; 73/12.04
[58] Field of Search .................. 73/12.04, 12.05, 12.09, 73/12.11, 167, 178 H, 178 R, 178 T, 12.01; 364/424.06, 550; 220/429, 468; 206/521

[56] References Cited

U.S. PATENT DOCUMENTS

| | | | |
|---|---|---|---|
| 4,510,803 | 4/1985 | Perara | 73/178 R |
| 4,729,102 | 3/1988 | Miller, Jr. et al. | 364/424.06 |
| 4,944,401 | 7/1990 | Groenewegen | 206/521 |
| 5,053,967 | 10/1991 | Clavelloux et al. | 364/424.06 |

Primary Examiner—Richard E. Chilcot, Jr.
Assistant Examiner—R. Biegel
Attorney, Agent, or Firm—Luther A. Marsh

[57] ABSTRACT

The hardened data acquisition system (HDAS) of the present invention is a compact system built to fit within a canister container, which may be inserted in a moving projectile, such as an artillery shell. Any shock level, air pressure or acceleration/deceleration experienced by the HDAS is measured by a transducer as an analog signal. The analog signal, after proper amplification and filtering, is fed to an analog-to-digital converter and converted into a digital signal. The digital signal is in turn fed to a memory where a predetermined amount of the data is recorded. The thus recorded data can be downloaded to the external environment by an interface section. To provide integrity, the different electronic circuit components of the HDAS are encased in plastic instead of ceramic. Moreover, the different electronic components are encapsulated with an epoxy resin, before being inserted into a canister container. After insertion, the container is filled with shock isolation microballoon particles to envelop the electronic components. With such a configuration, the HDAS is able to withstand a tremendous amount of force and still be able to accurately record the acquired data. The HDAS is also able to maintain its memory for several months due to the very low power requirement in standby status, thus affording measurements in areas prohibiting immediate re-entry.

38 Claims, 11 Drawing Sheets

HARDENED DATA ACQUISITION SYSTEM

STATEMENT OF GOVERNMENT INTEREST

The invention described and claimed herein may be manufactured and used by or for the Government of the United States of America for governmental purposes without the payment of royalties thereon or therefor.

FIELD OF THE INVENTION

The present invention relates to data recording devices, and more particularly to a self contained hardened data acquisition system that can withstand high shock and impact levels, and record data relating to those levels, as well as acceleration if the system is adapted to a moving vehicle, for later studies.

BACKGROUND OF THE INVENTION

An urgent need has existed, for at least the last decade, for a reliable, high-quality, autonomous device to record and store dynamic blast effects data in severe inertial fields. Current and future weapons effects research requires that measurements be made very near the explosive source, where shock levels commonly approach and sometimes exceed 100,000 g's. Conventional, wired sensor signal cables exposed to these environments almost invariably fail, at first shock arrival or shortly thereafter, from effects of high thermal flux and cable shearing due to rapid differential displacement.

In the prior art, to measure shock levels and air pressures resulting from shock waves generated as a result of an explosive blast, cables connecting the measurement transducer(s) and its signal conditioning modules, which ordinarily are rack mounted in an instrumentation vehicle (van), with one module for each transducer, are used. It is in the instrumentation vehicle that a shunt calibration resistor is mounted in series with a set of relay contacts. When the relay contacts are energized, a calibration resistor (used in a calibration step of a signal conditioning unit) shunts one arm of the bridge of the transducer. The calibration step, and the subsequent data, are recorded by either an analog tape machine or a transient data recorder. Both the signal conditioning and record units require large amounts of space and considerable power. Furthermore, they must be protected from the environment to the extent that the vehicle must be air conditioned to maintain a constant temperature. In addition, these units are not designed to withstand shock levels exceeding 50 g's, and therefore must be located hundreds to thousands of feet from the blast.

Therefore, to record the shock or air pressure levels, the prior art method requires that cables be used between the transducer and the rest of the system. This places a limit on how close to the detonation measurements can be made, as the survivability of the cables decrease as the measurement point nears ground-zero. On large explosive tests, this distance becomes significant, so much so that complete and definitive measurements within the ground-zero region of these tests have yet to be made.

Thus, the measurement of air pressure levels and shock levels, i.e. high pressures, and accelerations (ground motion) in close proximity to ground-zero (the location of the explosive), has been limited because of the destruction of the data cables early in the explosion phase of the tests.

This limitation aside, the use of long cables becomes disadvantageous because of the inherent significant cable resistance and capacitance which tend to place severe restrictions on transient data fidelity and calibration data validity.

So, too, the frequency response of the cables should be equal to or better than the frequency response of the transducer that is providing the data. That is, a typical waveform is made up of both low and high frequency components, and the cables should be able to transmit the waveform without distorting it. However, the distributed capacitance associated with long cables acts as a low-pass filter that attenuates the amplitude of the high frequency components and shifts their phase (delays them in time). The low frequency components of the waveform, on the other hand, are unaffected. The frequency range of the cables can be extended by "swamping" the output of the cables with a low resistance value. However, a very high penalty is paid, as the amplitude of the entire signal is reduced, thereby decreasing the signal to noise ratio.

Further, long cables attenuate the signals generated by a transducer. As mentioned above, this attenuation is exacerbated by the low resistance termination, which is needed to improve the frequency response of the cables. Added to this is the requirement that the frequency response of the amplifier must also be equal to or better than the frequency response of the transducer. Moreover, the added cable attenuation requires increasing the gain of the amplifier. However, increasing the gain of the amplifier decreases its frequency response. Amplifiers with no bandwidth to spare will then distort the signals. The use of wideband amplifiers, operated at high gain, are then required to faithfully reproduce signals with high frequency components. Yet such wideband amplifiers used in prior art methods are closely stacked. And when operated at high gains, these amplifiers tend to crosstalk. In addition, if one of the amplifiers has a tendency to oscillate, the whole rack of such stacked amplifiers will likely oscillate in sympathy.

Still another problem with long cables is that they introduce errors in the scaling of the calibration pulse generated by the application of shunt calibration resistors across the arm of the transducer bridge. The principle applied here is that a resistance of proper value, so placed, unbalances the bridge by an amount equivalent to that caused by a known value of the measurand. This in turn provides the key value used to scale the entire waveform. On long lines the accumulated resistance and circuit configuration are such that large errors can be generated and must be factored out. The usual method of doing this is to measure the line resistance and place these values in an appropriate formula to calculate the correction factor. These additional data measurement and calculations (one for each transducer) is both time consuming and error vulnerable.

Yet still another problem with long cables is that they act as antennas and are susceptible to noise and crosstalk. This is especially true when they are run in parallel, which usually cannot be avoided for explosive tests. The majority of the transducers are located near ground zero, and all of the cables must terminate in the instrumentation vehicle that carries the equipment for the measurements. In an active electromagnetic environment where many researchers have instrument trailers feeding respective transducers in a common region, data transmission interactions can and do occur when the equipment is operating at full power and full frequency. Even when this interference is not noticed on the final dry run, any last minute changes introduced before zero-time can contaminate the data of the more susceptible systems. Again, the worst case situation is when all of the cables are run in parallel, which often cannot be avoided. For example, many of the tests are done in tunnels or underground; and there is usually a common point where all of cables enter the test region.

Another further disadvantage of employing long cables is their susceptibility to developing destructive surge currents that are induced by potential lightning discharges at the test site. It has been known that several major explosive tests have been postponed and reinstrumentated at great expense because of this phenomenon.

Lastly, procurement of miles of cables is very expensive and installation costs are also high.

Cables aside, another hurdle that needs to be surmounted is the required portable nature of the data acquisition system, particulary in view of the fact that such data acquisition system oftentimes has to measure the impact levels and acceleration of a moving vehicle, such as for example a projectile in flight.

In view of the many aforenoted disadvantages, there is a need for a data acquisition system that can operate independently of previously required long cables and yet remain substantially unaffected by shock levels and pressures from an explosive source. Also, a need exists for a small, low mass measurement/acquisition device that can be carried on board of a moving projectile and be able to operate in an extremely high inertial environment. Needless to say, such data acquisition system must also be able to continue recording the shock levels and/or the air pressures of a ground level explosion, and the impact levels and acceleration were the system placed aboard a projectile, notwithstanding the many possible thousands of g's that may accompany such explosion and/or the movement and impact of the projectile.

SUMMARY OF THE INVENTION

The hardened data acquisition system (HDAS) of the present invention is a self-contained transient data recorder capable of withstanding shock in the neighborhood of 100,000 g's. Although not necessarily required, the entire system including a transducer and two battery packs must fit inside a circular cylinder approximately 2.5" in diameter and 6" high, with all of the necessary electronics to power the transducer and receive the raw analog data from it. By means of the electronics, the analog data is amplified, filtered, digitized and stored in the system's internal memory for later studies.

Specifically, the HDAS has a signal conditioning section, a power supply section, an analog-to-digital converter (A/D) section, a memory section, an interface section and a control section.

A transducer for measuring shock levels (or air pressures, or accelerations/decelerations) is connected to the inputs of an instrumentation amplifier in the signal conditioning section. The analog signal thus detected by the amplifier is forwarded to an anti-aliasing filter so that the high frequency, beyond a certain predefined level, of the analog signal is filtered. The filtered analog signal is then fed to an auxiliary gain amplifier and a buffer, before being fed to the A/D section.

The A/D section is a flash type analog to digital converter that is capable of converting quickly the analog signal to a corresponding digital signal having, in the present embodiment of the invention, 11 bits of data.

Thus converted, the digital signal is fed to the memory section where it is stored and triggered to received the data. Approximately 90% of the memory is used to store the digital signal data, with the remaining portion thereof being used to store pre-triggered data (required for complete waveform reconstruction when triggered by g-switch) and calibration data. The arming and triggering of the memory, as well as the selection of where in the memory the measured data is to be stored, are performed in the control section.

Once the desired data has been recorded, for evaluation, the data is downloaded from the HDAS via its interface section. The downloaded data can be displayed on a monitor, and report quality plots produced in the field.

In addition to being enclosed in a hardened canister container, to ensure that the HDAS is well protected and shock isolated, and therefor cannot be damaged by the being measured shock levels or air pressures, the respective sections, which can be mounted onto a board, are encapsulated with a semi-rigid epoxy resin and the container is filled with silicon micro-balloon particles.

It is, therefore, an objective of the instant invention HDAS to obtain measurements of shock and air pressure levels in close proximity to ground-zero (the location of the explosive), which, prior to the instant invention, had been limited because of the destruction of the data cables early in the explosion phase of the test.

It is another objective of the present invention HDAS to be a stand alone measurement and recording system that will withstand the force levels at approximately ground zero, in the neighborhood of 100,000 g's, due to the shock waves resulting from the explosion of the explosive being tested.

It is yet another objective of the present invention HDAS to provide a data acquisition system that is self-contained and can be operated without any external cables, thereby allowing it to be placed inside an artillery projectile or penetrating weapon and gather acceleration and de-acceleration data, as well as impact data, experienced by the device. Such data is crucial in the design and testing of intelligent fuses and other military hardware. The same data is also usable in the investigation of the capabilities of various material aggregations and structural designs to thwart or control target penetration.

BRIEF DESCRIPTION OF THE DRAWINGS

The above-mentioned objectives and advantages of the present invention will become more apparent and the invention itself will be best understood by reference to the following description of an embodiment of the invention taken in conjunction with the accompanying drawings, wherein.

DETAILED DESCRIPTION OF THE PRESENT INVENTION

Figure 1:
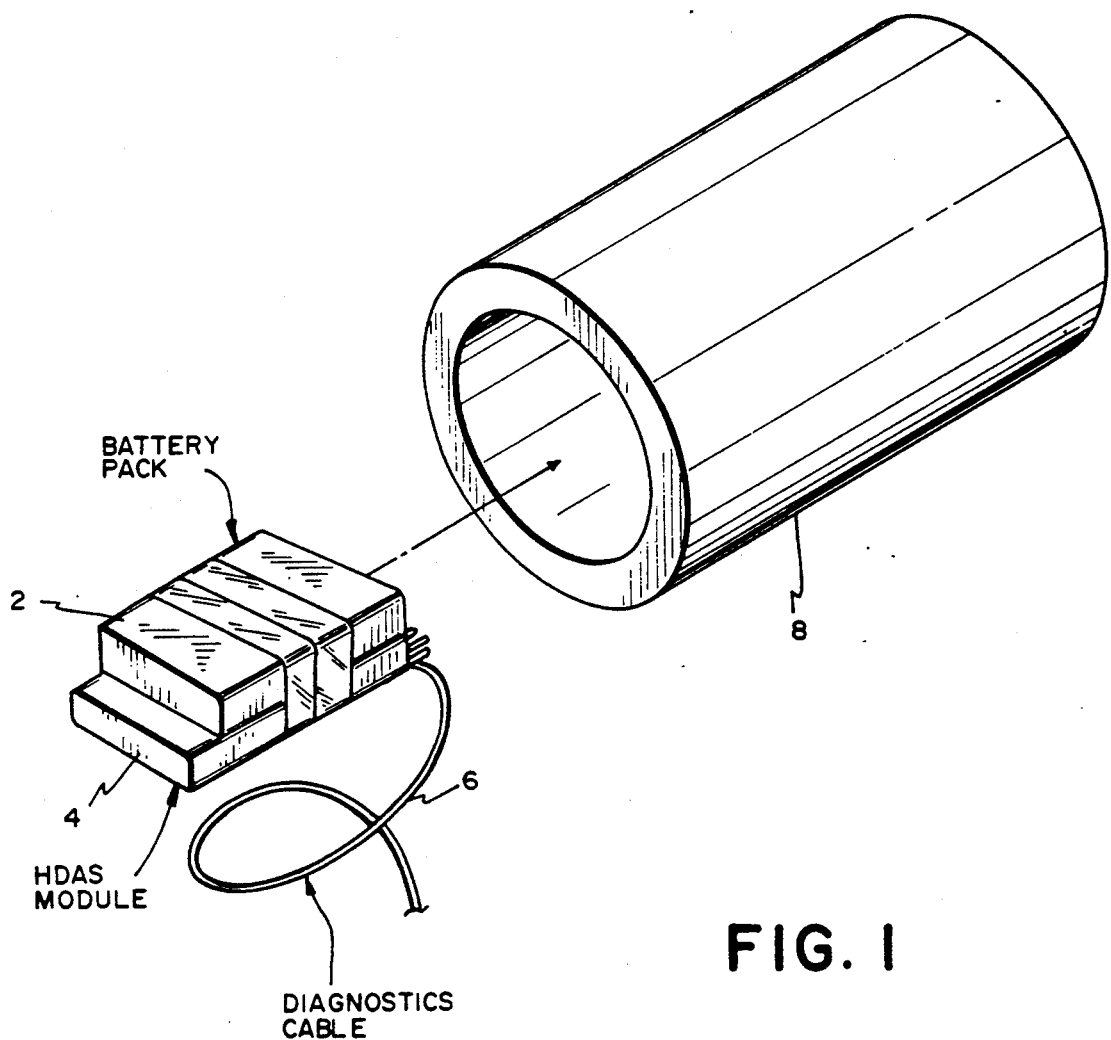
FIG. 1 is a perspective view of the HDAS of the present invention, shown as encapsulated in a block, and to be inserted into a canister container.

With reference to FIG. 1, there is shown a present invention hardened data acquisition system (HDAS) which comprises a battery pack 2 and a module comprising a printed circuit board 4, shown encapsulated in a block, and connected to diagnostics cables 6. One end of the unit contains resistors (resistors R21, R22, R24 and R25 shown in FIG. 7) that are removable and therefore are not encapsulated. The combination battery pack and module are to be inserted into the illustrated canister container 8, which may be made of aluminum and has, for example, an inside dimension of 2.5 inches in diameter by 6 inches deep. It should be appreciated that the dimensions given for the canister container is for illustration only and is not meant to be limited to the example dimension.

Although not clearly shown, diagnostic cables 6 comprise at least four external wires, three of which are used to arm (initiate), calibrate and trigger the system. The remaining wire is a return wire. An optional fifth wire is often used to monitor if the system is armed. All of the wires leading into the system may be optically isolated from HDAS module 4, by means of an optical-isolator interface circuit, shown in FIG. 11, to protect the HDAS module from electro-magnetic noise.

After the trigger signal (more of which will be discussed later) has been received, all of the external wires are expendable. In other words, the system will continue to gather data and performed as intended, irrespective of whatever happens to the wires. In addition, although not shown, the system has a built in backup trigger, a so called g-switch which is acceleration sensitive and will nominally close at 350 g's to automatically trigger the system. Besides acting as a backup trigger, the g-switch allows the system to function as a wireless stand alone unit. The g-switch is made by the Accudyne Company of Janesville, Wis.

Figure 12:
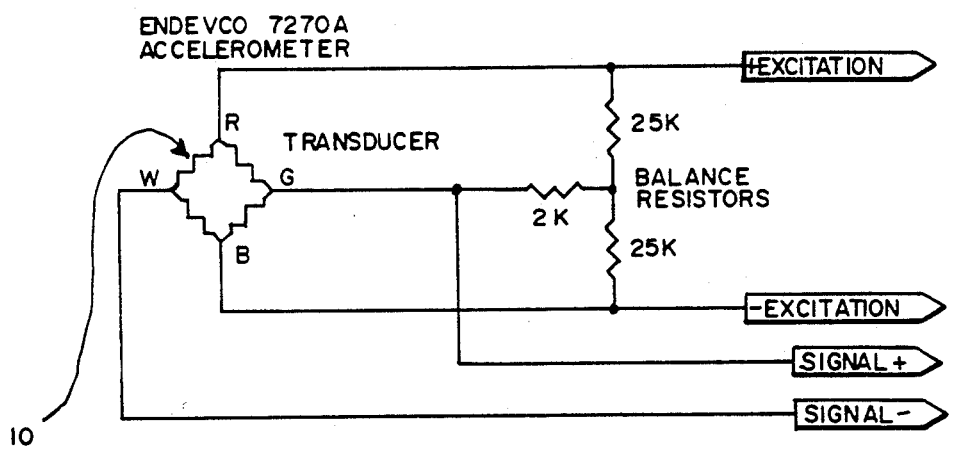
FIG. 12 is the schematic of a transducer for the HDAS.

In addition to the battery pack and the HDAS module, not shown in FIG. 1 but attached to the encapsulated block is a transducer, for example such as that shown in FIG. 12. As should be appreciated, different types of transducers may be used to measure or detect different types of pressures. For example, the transducer which is to be used to detect shock levels or air pressures is different from that to be used to measure acceleration or de-acceleration of a projectile in flight. In any event, transducer shown in FIG. 12 is a pieozoresistive bridge-type transducer that is manufactured by the Endevco Corporation of San Juan Capistrano, Calif.

The circuit board of the HDAS module is comprised of a single 6-layer printed circuit board with example dimensions of approximately 4.5 inches×1.9 inches×0.062 inches. In order to achieve maximum possible density, all of the electronic components (to be described in more detail later) are leadless surface mounted parts that can be attached to both sides of the board. To further reduce the component count, all of the address counters and control logics are built into two semi-custom integrated circuits shown in FIGS. 9 and 10 (also to be described in detail later) which are made by the Altera Company located at Santa Clara, Calif.

In order that the HDAS module functions properly and survives shock levels in the neighborhood of 100,000 g's, all of the integrated circuits used are packaged in plastic, instead of the ceramic packaging. Also, the different electronic components, the board and the battery packs are encapsulated by a semi-rigid epoxy resin, such as the Emerson & Cuming STYCAST 1090SI, by means of a mould. The STYCAST 1090SI is a low weight epoxy resin which is manufactured by the Emerson & Cuming Company an iscussion thereof is given in the article entitled *STYCAST* 1090, *Low Weight Foam Epoxy Casting Resin*, published by the Emerson & Cuming Co., 1979, incorporated herein by reference.

To shock isolate the HDAS module and the battery packs from canister container 8, the former are embedded in an easy pourable low density filler, such as silicon micro-balloon particles that range in size from 10 to 250 microns. Such echosphere micro-balloon particles are described in the article entitled Echosphere Microballoon(s), published by Grace Syntactics, Technical Bulletin 1988, incorporated herein by reference.

The transducer, such as for example the one shown in FIG. 12, with sufficient lead length, may be first mounted in a port machined in canister container 8. The transducer leads are then connected to the encapsulated block containing the HDAS module. A layer of micro-balloons is then poured into the canister to backfill the transducer. This is followed by the insertion of the package containing the HDAS module. Once centered, the space around the package is filled with additional micro-balloon particles. Finally, the canister is capped.

As a consequence, the electronic components of the HDAS are quadrupledly protected; that is, the components themselves are insulated by plastic rather than ceramic; there is a STYCAST 1090SI epoxy resin completely encapsulating the different components; the encapsulated components are next shock isolated by means of micro-balloon particles; finally, all of the components are enclosed by a metallic canister container.

Figure 2:
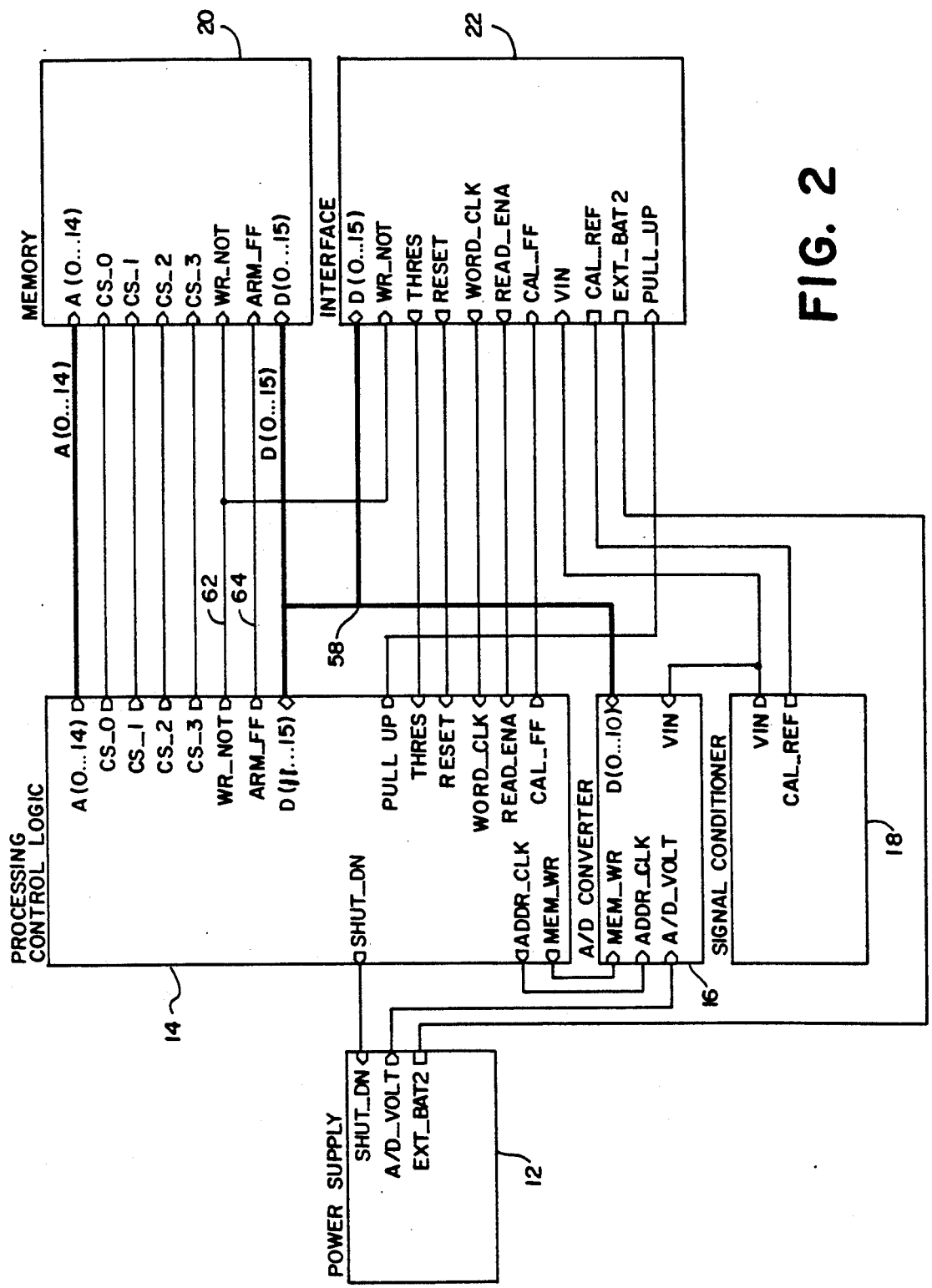
FIG. 2 is a block hierarchical schematic depicting the different electronic sections of the HDAS and the interconnections thereof.
Figure 3:
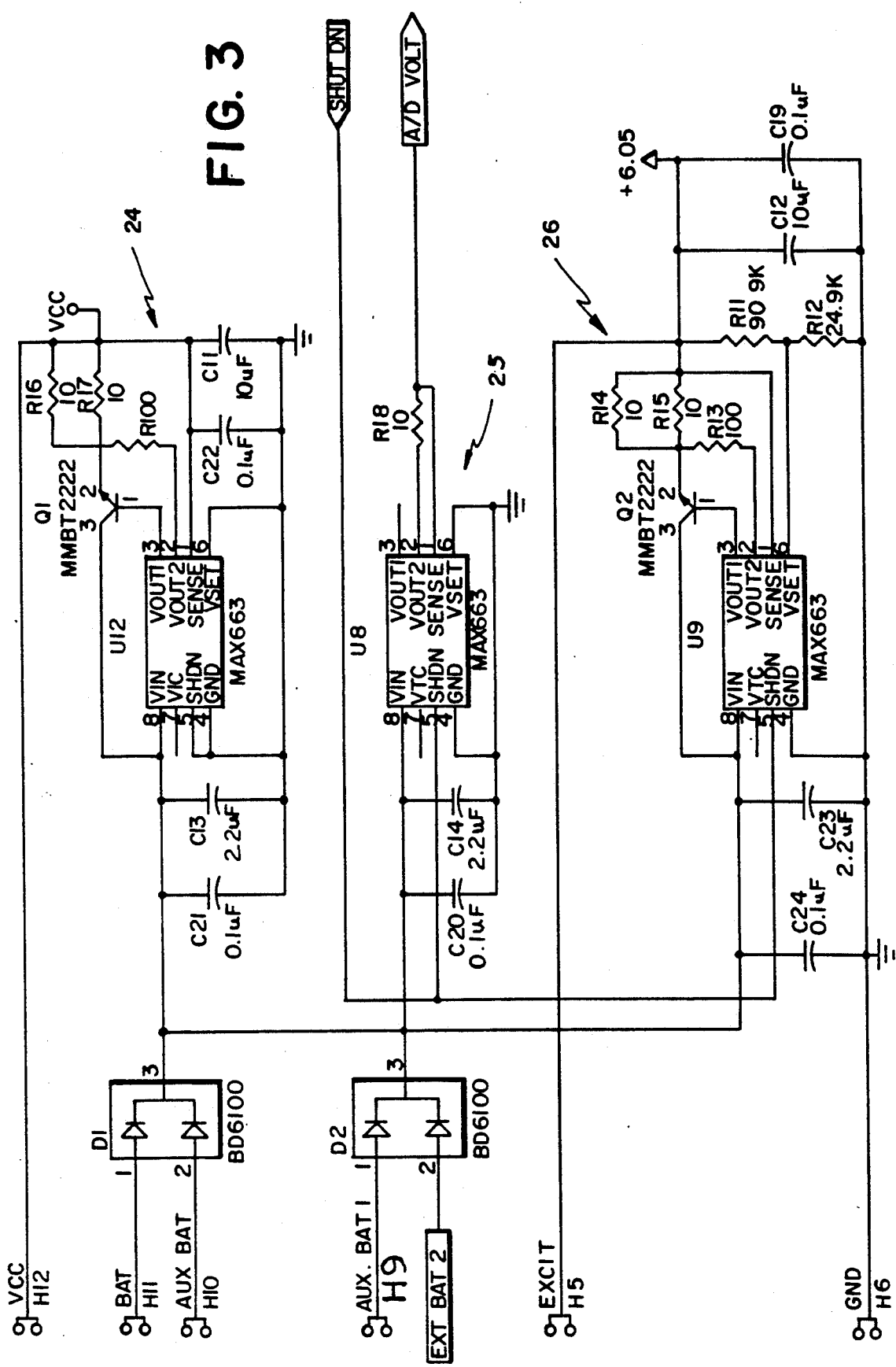
FIG. 3 is the schematic of the power supply section of the HDAS.
Figure 4:
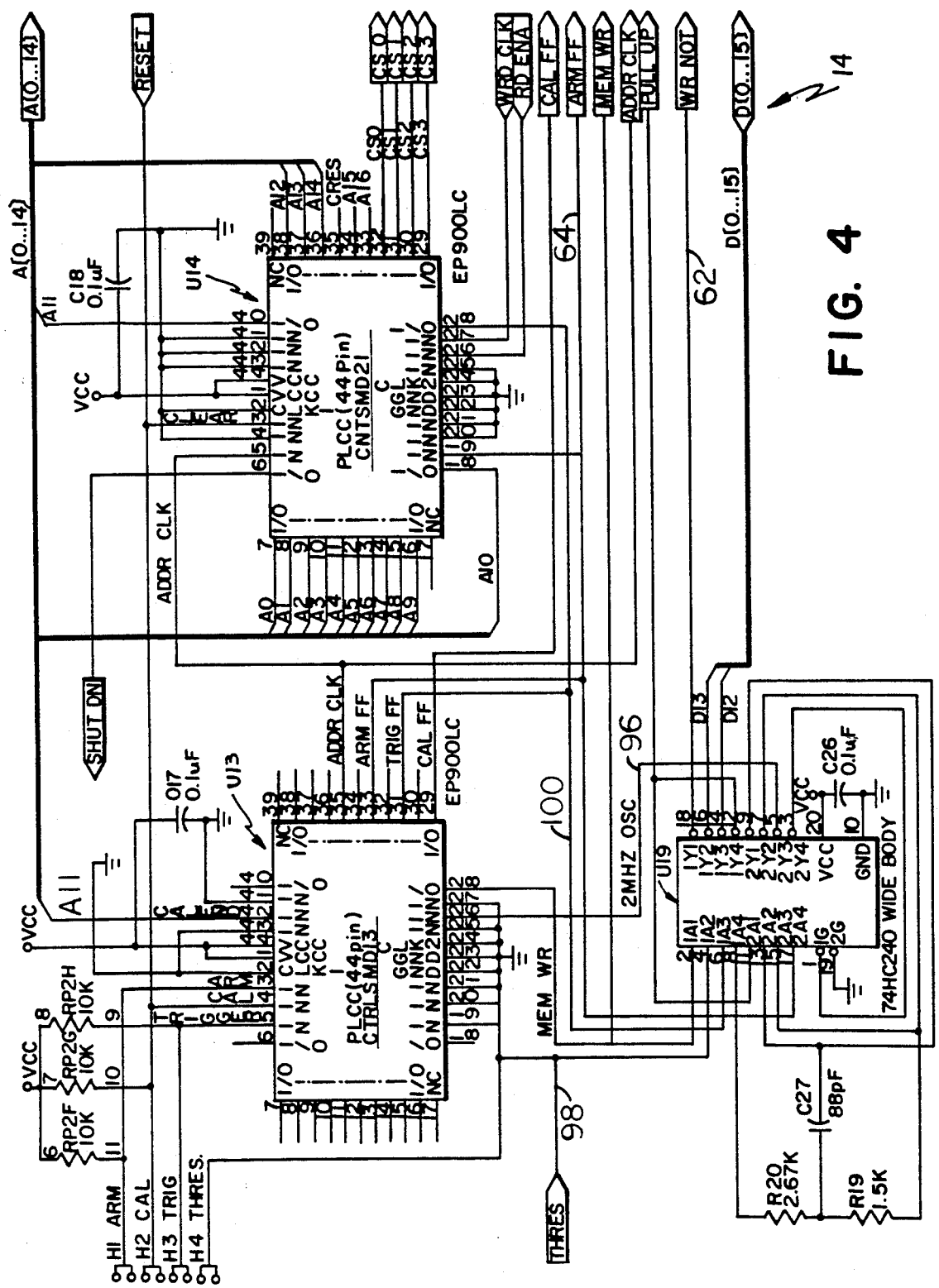
FIG. 4 illustrates the processing control logic section of the HDAS.

The hierarchical schematic of the different electronic components, and their interconnections, of the HDAS is illustrated in FIG. 2. As shown, the HDAS has a power supply section 12, a processing control logic section 14, an analog-to-digital (A/D) section 16, a signal conditioner section 18, a memory section 20 and an interface section 22. Each of the respective sections is illustrated in more detail as follows: power supply section 12 is schematically shown in FIG. 3; processing control section 14 is schematically illustrated in FIG. 4; A/D section 16 is shown in detail in FIG. 5; memory section 20 is schematically shown in FIG. 6; signal conditioner section 18 is shown divided into its respective components in FIG. 7; and interface section 22 is shown schematically in FIG. 8. Additionally, the semi-custom integrated circuits of processing control section 14 are respectively illustrated in FIGS. 9 and 10.

Concentrate for the moment on FIG. 3, which depicts power supply section 12 with the power supplies and voltage regulators for the HDAS. All of the power supplies use voltage regulators which are made by the Maxim Company having part number Maxim 663C5A. This type of voltage regulator is selected because: (1) it is available in a 8- pin plastic, surface mount package; (2) no external resistors are required for the standard 5 volt output; (3) current limiting for this voltage regulator can be set via a single external resistor; (4) it has a shut down pin which is compatible with CMOS logic signals; and (5) in the shut down mode, this voltage regulator draws only 10 uA. Futhermore, if the input voltage should drop below 5 volts, the output voltage does not collapse, but instead becomes linearly related to the input voltage. Accordingly, the static memory which contains the captured waveform will retain its integrity as long as its supply voltage does not drop below a predetermined voltage, for example 22 volts.

As shown, power supply section 12 has three power supplies, each with its own voltage regulator. Power supply 24, with voltage regulator U12, produces a 5 volt output and is used to power all of the logic circuits, including memory section 20. The middle power supply 25, utilizing voltage regulator U8, also produces a 5 volt output and is used exclusively to power A/D converter section 16. There are two reasons for using a separate power supply for the A/D converter. First, the A/D convertor is quite noisy. Therefore, it produces power surges, i.e. spikes, on the power supply line which, if connected to other parts of the system, could cause problems. Second, when the A/D converter is active, it draws in the neighborhood of 20 mA. Therefore, it needs to be shut down when it is not in use, in order to conserve energy.

Bottom power supply 26, with voltage regulator U9, produces 6.05 volts and is used for excitation and to power signal conditioner section 18. The reason that a higher voltage is used is due to the fact that the operational amplifiers used in the signal conditioner section can swing only to the positive rail, minus one diode drop of 0.7 volts. However, the amplifier needs to swing to the full scale range of the A/D converter, which is from 0 to 5 volts. Again, when not required, power supply 26 is shut down to conserve energy. As shown in the schematic of FIG. 3, the current limiting feature is used in all three of the power supplies.

For the power supplies, the batteries that are used in the system are comprised of standard industrial grade alkaline cells that are removed from conventional 9 volt transistor batteries and reconnected to the leads, indicated at the left hand portion of FIG. 3. Each battery contains seven 1.5 volt cells, a total of 10.5 volts is obtained. For protection, the cells are potted in the Emerson & Cuming STYCAST resin. It should further be appreciated, from FIG. 2, that for interrogation an external battery can be connected to the edge connector of the interface section 22. This is useful when the internal (inside the Canister) batteries are near depletion.

Figure 7:
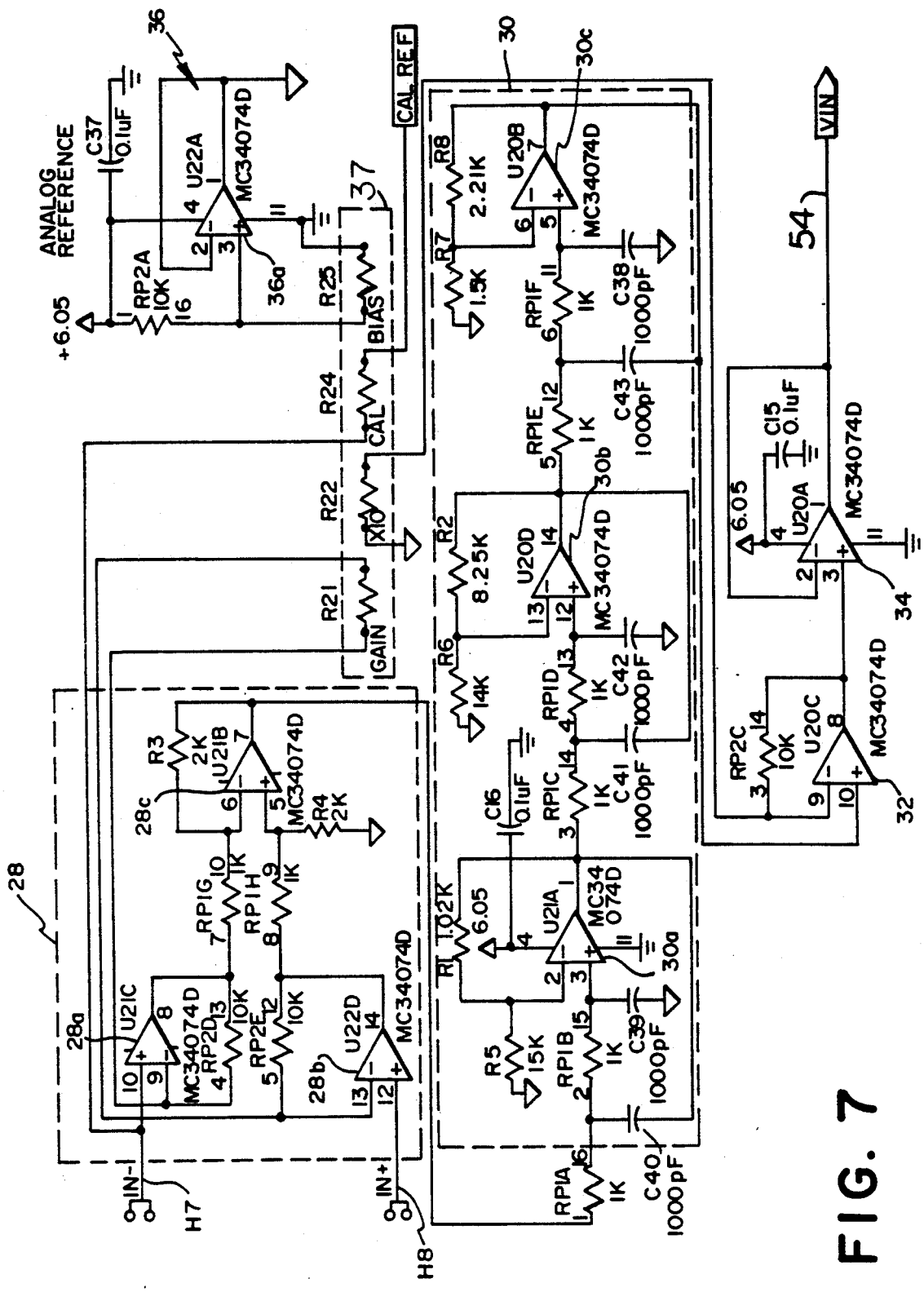
FIG. 7 is the schematic of the signal conditioner section of the HDAS.

As was mentioned previously, a transducer, such as that shown in FIG. 12, is connected to signal conditioner section 18, shown in detail in FIG. 7. There, it can be seen that the signal leads of transducer 10 are connected to input leads H7 and H8 of an instrumentation amplifier, enclosed in the dotted line box designated 28.

Particularly, instrumentation amplifier 28 comprises three operational amplifiers, designated 28a, 28b, and 28c. These operational amplifiers are MC34074D type IC chips. In fact, all of the operational amplifier in signal conditioner section 18 are of the same type. For instrumentation amplifier 28, operational amplifier 28a and 28b together form a differential voltage gain device that is fed to operational amplifier 28c which produces a single-ended output. As is well known, the input impedance of an instrumentation amplifier is typically very high and its output impedance is small. The operation of such instrumentation amplifier is well known and is not further elaborated herein. The output, at pin 7 of operational amplifier 28c, of instrumentation amplifier 28 is fed to the first stage of an anti-aliasing filter that is comprised of three operational amplifier, encircled by dotted line designated 30.

As is well known, an anti-aliasing filter ensures that aliasing of an input signal does not occur by bandlimiting the signal, i.e. filtering out frequencies of this signal above some upper limit.

In general, a transducer converts mechanical energy into electrical energy. An ideal result occurs if the output is an exact electrical analog of the mechanical input. In practice, however, the output is usually considered a faithful reproduction of a dynamic input when the output verses frequency plot (transmissibility) of the transducer is flat to within the accuracy specified by the manufacturer. As is well known, the culprit that limits the upper frequency is usually the natural frequency of the transducer. Typically, the transmissibility curve is flat to 1/5 of the natural frequency and starts to rise slowly beyond this point until it peaks at its natural frequency. Thus, if a transducer is excited at frequency above 1/5 of its natural frequency, the components associated with these frequencies are amplified in comparison to the others, and must somehow be suppressed.

Other frequency abnormalities, in the form of discreet resonances associated with the gauge mount and hardened gauge enclosure, would also be present. These high frequencies would tend to mask the true measurement and therefore need to be attenuated.

For the Endevco transducer, shown in FIG. 12 and adaptable to be used in the embodiment of the instant invention, the manufacturer's upper limit for the transducer is approximately 100 KHz. Accordingly, the anti-aliasing filter's frequency response has been set to be flat from D.C. to 100 KHz. This in turn requires that the cut-off frequency, the 3 db down point, be somewhere above 100 KHz, depending on the number of poles the filter has. In view of the fact that the HDAS may be used with different transducers (for acceleration/deceleration, shock level and air pressure measurements), it was decided to use a 6-pole low-pass active filter, with a cut-off frequency of 160 KHz, as shown in FIG. 7. It should be appreciated that the anti-aliasing filter shown in FIG. 7 can have cut-off frequencies other than the chosen 160 KHz, as one skilled in the art can easily recalculate the required cut-off frequency for the different types of inputs (for different transducers).

After passing through the anti-aliasing filter 30, the analog signal is output at pin 7 of operational amplifier 30c and provided as an input to an auxiliary gain stage amplifier 32 for amplification. The thus amplified signal is next fed to a buffer 34, to ensure that the analog signal is compatible with A/D converter 16. As auxiliary gain stage amplifier 32 and buffer 34 are conventional, nothing more needs to said in regard to those component stages.

To provide for zero referencing, i.e. adjust the respective bias levels, of the different components in signal conditioner section 18, an analog reference circuit, designated 36, is used. Briefly, resistor RP2A and R25 form a voltage divider, with the resultant output being buffered by operational amplifier 36a, which acts as a low impedance voltage source. The output of operational amplifier 36a, the reference voltage, is controlled by resistor R25, which is typically 2.5 volts, i.e. the center point of the A/D range. Of course, the reference voltage can be adjusted in either direction. Note that all of the resistors in the block designated 37 (R21, R22, R24 and R25) are at one end of the HDAS and are left out of the encapsulation.

Figure 5:
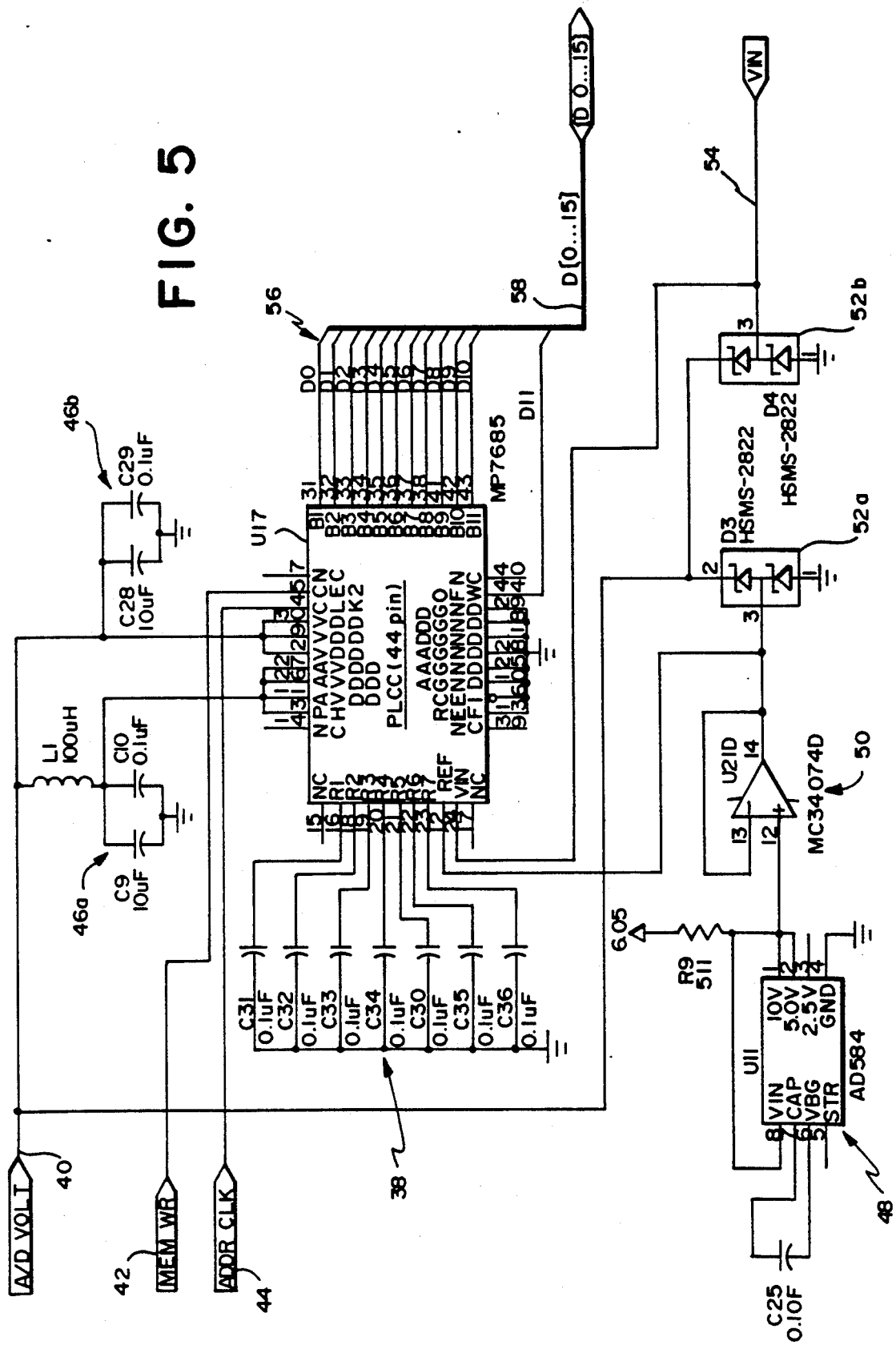
FIG. 5 is the schematic of the A/D converter section of the HDAS.
Figure 6:
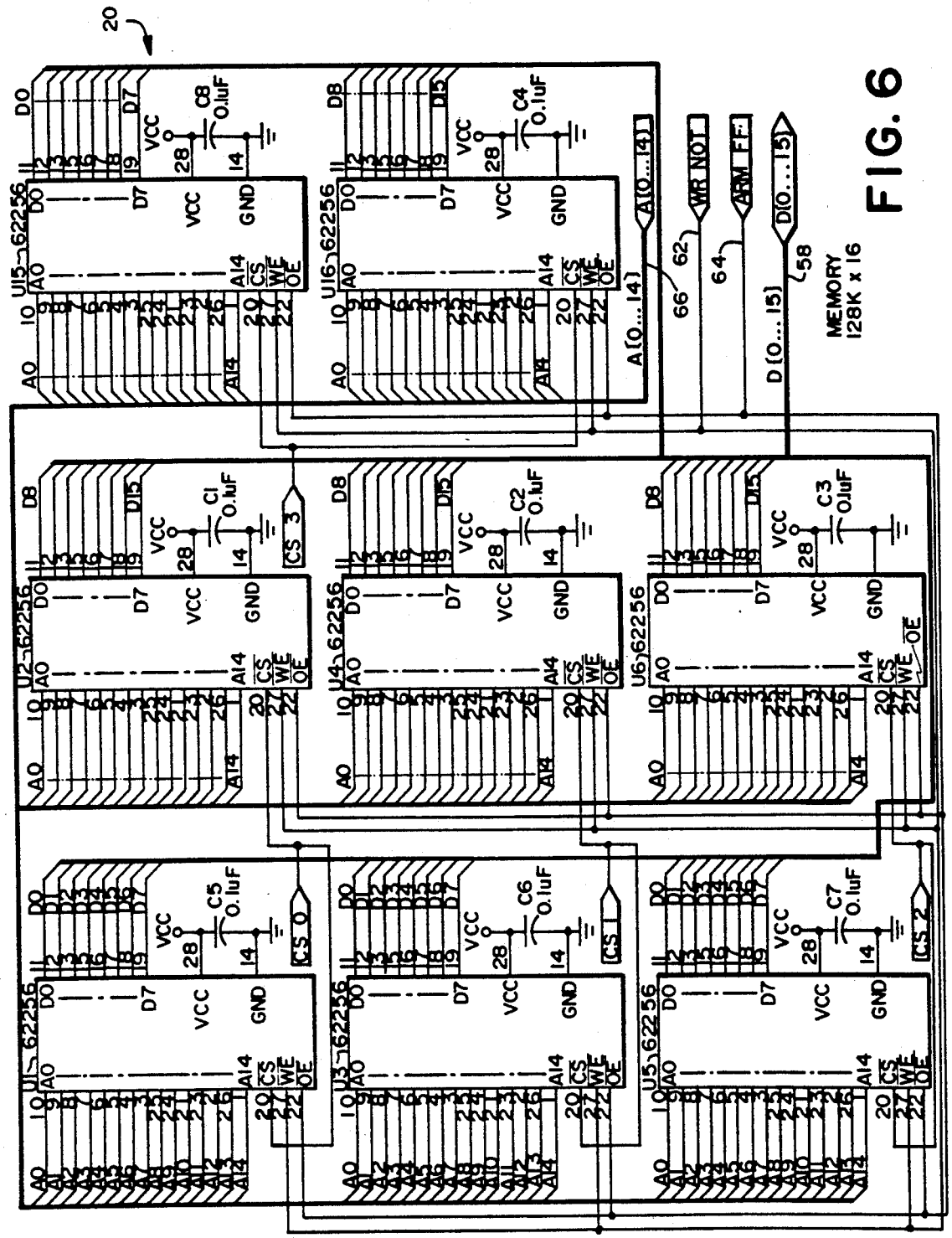
FIG. 6 is the schematic of the memory section of the HDAS.

Refer now to FIG. 5 wherein the detailed schematic of A/D converter section 16 is shown. Integrated circuit U17 depicted in FIG. 5 is an 11 bit, 1 MHz sampling rate, low power CMOS, single supply analog-to-digital converter that is manufactured by Micro Power Systems, Inc. of Santa Clara, Calif. This A/D converter is a half flash converter, which, as is well known, and operates extremely fast.

In order to significantly increase its shock-hardness, the A/D converter U17 is purchased in die form and packaged in an epoxy case by the Indy Company of Mantega, Calif.

To provide proper biasing the A/D converter U17 contains an internal resistor ladder which is decoupled by the capacitor network 38. In addition, A/D converter U17 is powered by power supply section 12, via line 40. Lines 42 and 44, emanate from processing control section 14 and respectfully enable the digital outputs of the A/D converter and start a conversion process. To decouple possible spikes in the power supply line 40, filters 46a and 46b are used. To provide for proper voltage referencing, a conventional voltage reference circuit 48 and voltage follower circuit 50 are used. Shockley diode pairs 52a and 52b provide clamping for the signal such that the signal will not fall below ground and above the reference voltage.

As shown, the input analog signal is provided at line 54, from signal conditioner section 18. This analog signal is fed to A/D converter U17 and an output, represented by an 11-bit digital signal, at lines D0 to D10, together designated as 56, is provided to bi-directional bus 58, which is connected, as shown in FIG. 2, to memory section 20.

The detailed schematic of memory 20 is shown in FIG. 6. As illustrated, memory 20 has 8 integrated circuits, designated as U1, U2, U3, U4, U5, U6, U15 and U16. These memory circuits are manufactured by the Hitachi Company, having part numbers HM62256LEP. Other manufactures such as NEC, Mitsubushi, Toshiba and SMOS also manufacture the same memory chips.

These memory chips are low power chips having access time of 120 ns. Each of the chips has approximately 256,000 memory cells. As organized in FIG. 6, memory 20 has 15 address lines A0 to A14, carried to each one of the chips by means of line 66. As was mentioned previously, the input to memory 20 is provided by line 58, connected to A/D converter U17 of A/D converter section 16. Lines 62 and 64, which are respective write and enable lines, emanate from the processing control section 14. The whereabouts of memory 20, with respect to which chip and where on the chip data is to be stored, is effected by processing control section 14, via line 66, CS 0, CS 1, CS 2 and CS 3.

Figure 9:
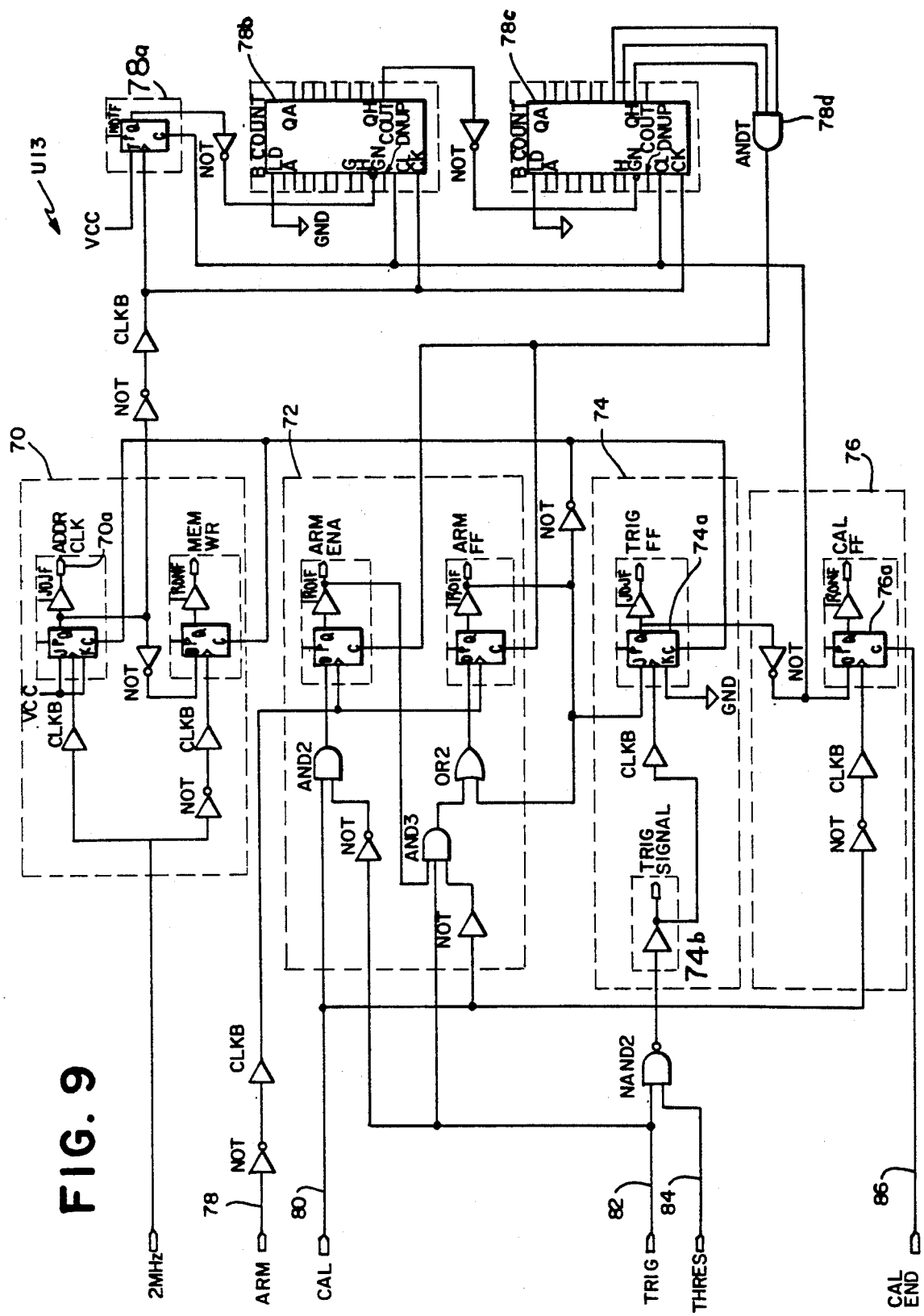
FIG. 9 is the schematic of one of the semi-custom integrated circuit chips of the FIG. 4 processing control logic section.
Figure 10:
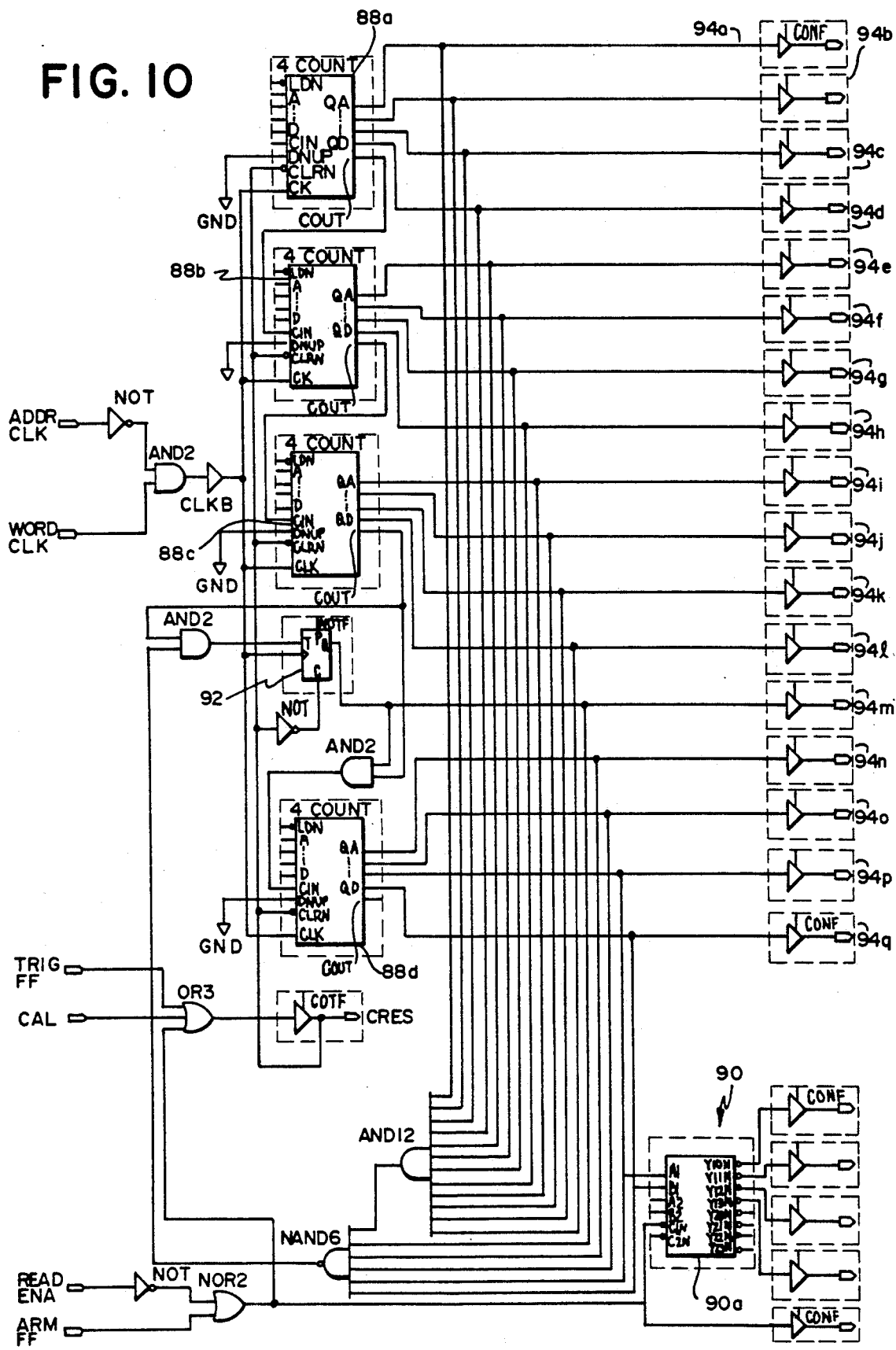
FIG. 10 is the schematic of the other semi-custom IC chip for the FIG. 4 processing control logic section.

Refer now to the processing control section shown in FIGS. 4, 9 and 10. As was stated earlier, the IC chip designated U13 in FIG. 4 is shown in detail in FIG. 9, while the IC chip designated U14 is shown in detail in FIG. 10.

Before dissecting the respective schematics of FIGS. 4, 9 and 10, a brief overall view of the operation of the HDAS, with specific emphasis on how memory 20 is initiated and how retrieved data is stored therein, is hereby presented.

Before the HDAS can be operated, it is necessary to arm, i.e. initiate, the device in order to bring it out of its dormant low power state. This can be either manually achieved, by using a control box and a multi-conductor cable having, for example 4 wires as disclosed earlier; or programed via a laptop computer into the HDAS with unique timing and firing sequence commands, in order to limit the probability of accidental initiation. Upon being successfully initiated, a confirmation is given by the HDAS on an optional conductor 5. Only after the HDAS has been armed can it be calibrated and triggered. The same multi-conductor cable may be used to calibrate and trigger the device; or alternatively, a trigger command may be internally generated from the acceleration sensitive g-switch, mentioned previously.

Once triggered, the cable is expendable such that any electrical artifact it may subsequently generate is ignored by the HDAS. A common cable is required in order to derive time of arrival where a plurality of HDASs are used to measure the shock levels or air pressures of an explosion, as for example when different transducer sites are required. On the other hand, when the HDAS is to be adapted to a projectile, or other moving objects, the cable is disconnected after calibration and the trigger command is generated internally, by the g- switch. It should be appreciated that even were the primary trigger mechanism to be used is via the cable, the acceleration/deceleration sensitive g-switch is left in place and acts as a back-up, to ensure that the HDAS begins recording the of interest data when a certain g level is reached, for example 350 g's.

Once the HDAS has been armed, it draws full power and furnishes excitation power to the transducer. Futhermore, it immediately starts to record data in a wrap-around mode. Putting it simply, a wrap-around mode means that once the memory is full, the oldest data point in the memory is continuously being replaced, or updated, by the newest data point. After the system has been armed, it can be calibrated. However, some time should be allowed for the system to reach thermal equilibrium before calibration. After calibration, the system automatically returns to the wrap-around mode.

The HDAS, upon receiving a calibration command, shunts a calibration resistor across one arm of the bridge circuit of the transducer shown in FIG. 12. This causes an imbalance in the transducer equal to that of a known measurand. The resultant output (and the measured data immediately after the calibration resistor is removed) is stored in the portion of the memory that is allocated for calibration. For the instant invention embodiment, approximately 97% of the memory is allocated for continuously recording the incoming data. The remaining 3% is unaffected by the wrap-around mode, as it is being used to store the calibration data. After calibration, as was stated previously, the system returns to its wrap-around mode and awaits the trigger command.

Upon receiving the trigger command, the HDAS continues to record data in the wrap-around mode until approximately 90% of the allocated memory has recorded data points which occurred after the trigger command. At this point, the HDAS removes excitation power from the transducer, and goes into its dormant low power mode. Other electronic components inside the HDAS are also powered down at this time. Thus, approximately 10% of the memory allocated for the wrap-around portion of the memory contains data that occurs prior to the trigger command. This data is used subsequently to reconstruct what occurred just prior to the trigger command. This is particularly deemed to be essential when the system is to be triggered from its internal acceleration sensitive g-switch, which for the present embodiment is to activate at 350 g's.

Return now to the schematic of FIG. 9 showing the different circuits of semi-custom IC chip U13 of processing control section 14. As shown, the U13 circuit, in actuality, is divided into the following four circuits, each designated by a dotted box: a timing state circuit 70, an arm (initiation) state circuit 72, a trigger circuit 74 and a calibration circuit 76. Timing state circuit 70 provides the timing for processing control section 14, as it is being fed with a 2 MHz clock. An output of timing state circuit 70 is fed, by means of lines 70a, to IC chip U14. It also provides timing to counters 78a, 78b and 78c, which are used to determine when 90% of the memory has been recorded with post-tri data, when the predetermined count has been reached, a signal is sent from AND gate 78d to the appropriate flip-flop(s) of IC chip U13.

Arm state circuits 72 is comprised of two flip-flops, and associated logic gates, for initiating the memory, such that the same may be calibrated and be prepared for receiving the trigger signal. Trigger circuit 74 is comprised of flip-flop 74a and a buffer 74b, which must be used in this embodiment to ensure that the circuit is microcell compatible. Calibration circuit 76 is comprised of a flip-flop 76a and, as its name implies, is used to calibrate the memory, discussed previously.

As shown, circuit 72 is controlled by ARM line 78, CAL line 80, and TRIG line 82. As was stated previously, arming of the HDAS is done by means of a predetermined sequence of steps. In the HDAS, lines 78, 80 and 82 are the lines which, in combination, when sequenced in a certain particular order, arm the HDAS. In addition, lines 80 and 82 as their respective names imply, calibrate and trigger the system for its wrap-around mode and its recording mode. Line 84 is connected to the previously discussed acceleration sensitive g-switch, which is set to be sensitive at 350 g's for this embodiment. The CA1 END line 86 which is address line 11 is used to end the calibration.

As shown in FIG. 4, the respective outputs from IC circuit chip U13 are connected to different corresponding inputs of IC chip U14.

As illustrated in FIG. 10, counters 88a to 88d are 4 count counters which, together with T-type flip-flop 92, provide the bit outputs, at 94a to 94q. The first 15 address lines 94a to 94o are tied directly to the address lines of the each of the memory chips shown in FIG. 6. They determine which of the possible areas of the memory chips are to be selected to store the data. The outputs at lines 94p and 94q form chip select logic circuit 90 determine which one of the memory banks shown in memory 20 is to be selected.

The remaining major component in processing control section 14 shown in FIG. 4 is IC chip U19. A part of this circuit is being used, in conjunction with the timing circuit designated 96, as the clock circuit of the HDAS. The clock frequency is controlled by R19, R20 and C27. Note that R19 is at the same location as the earlier referenced resistor block 37, and is also left out of the encapsulation. Another portion of chip U19 is used as a buffer inverter for both the g-switch, at line 98, and a pretrigger data/post line, at line 100.

Figure 8:
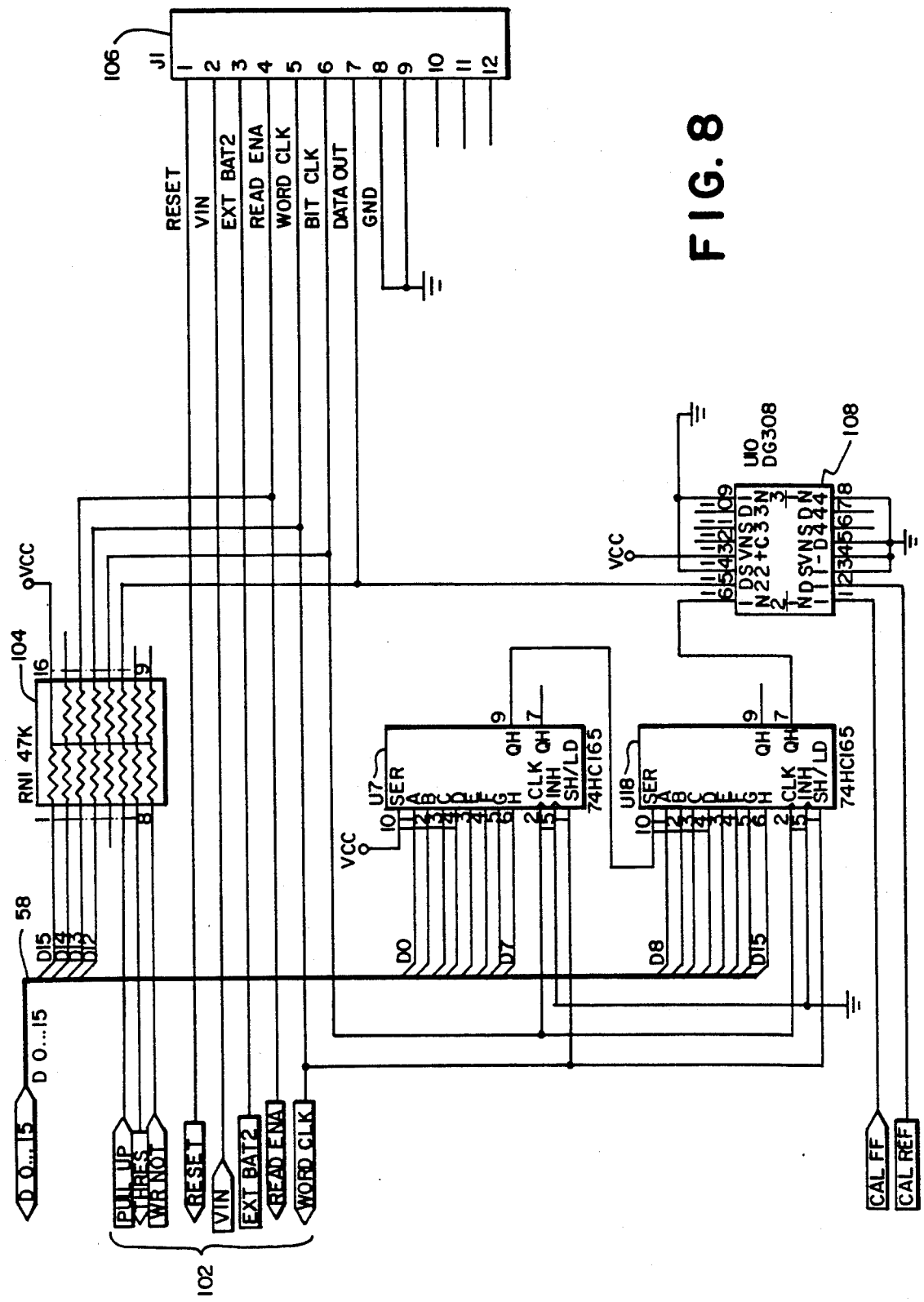
FIG. 8 is the schematic of the interface section of the HDAS.

The interface section 22 is illustrated in FIG. 8 shown being connected by lead 58 to a pair of shift registers U7 and U18 which, together, form a parallel-in serial-out shift register. All of the lines at the edge connector 106 go to the circuits shown in FIG. 4, for controlling the interfacing which occurs between the HDAS and a personal computer for displaying the recorded data. A resistor network 104 is provided in interface section 22 to act as pull up resistors, thereby preventing the lines which are connected to pins 1-7 of edge connector 106 from drifting. Edge connector 106 is a conventional CINCH female type connector. Alternatively, instead of an edge connector, other conventional types of connectors may also be used.

The data which is being provided to the external equipment, after being converted from parallel to serial by shift registers U7 and U18, is provided as an output data at pin 7 of shift register U18 and fed to an analog switch 108, which in this case is used as a buffer to ensure that the data fed to the outside is compatible with the external equipment. Also connected to analog switch 108 is the CAL FF line, fed from processing control section 14, and a CAL REF line, which is connected across the arm of the transducer, shown in FIG. 12.

Figure 11:
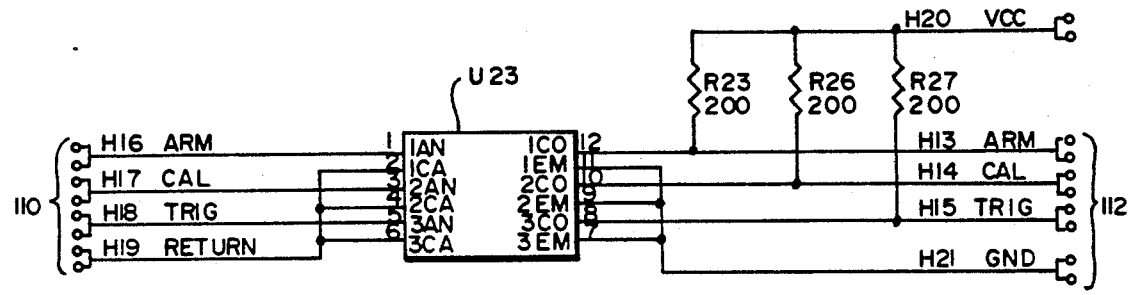
FIG. 11 is the schematic of an optical isolator interface which may be added to the HDAS.

In the case where the shock levels or air pressures of an explosive source is to be measured by a number of HDASs, to ensure that each one of these HDASs is triggered at the same time, the respective internal g-switches notwithstanding, an external cable is used. In such a situation, to ensure that each of the HDASs will not be affected by one of the other HDASs, an isolating means such as the optical isolator shown in FIG. 11 is used. Such an optical isolator interface is placed between the incoming wires from the cable, such as for example from an instrumentation van, designated 110, and the incoming signals to the processing control section of the HDAS, designated 112. The optical isolator itself is made by the Nippon Electric Company (NEC) having part number PS2401-3, and is designated as U23 in FIG. 11. Essentially, the optical isolator provides, instead of hard wiring between the incoming signal and the HDAS, an optical input, thereby isolating all HDAS units and preventing ground loop problems.

The loading of information from the HDAS to external equipment through interface section 22 is achieved in a conventional way.

In operation, inasmuch as the HDAS is compact and is capable of sustaining high g's without ill effects because of the myriad of insulations mentioned above, it can be used to detect different forces in different environments. For example, the HDAS may be used to measure the acceleration/deceleration of a moving projectile and the forces it encounters at impact. Alternatively, the HDAS may be used to measure the shock levels and air pressures caused by shock waves resulting from the detonation of an explosive device. For each of these different types of measurements, it should be appreciated that different types of transducers may be applicable.

Assume that the HDAS has been initiated and calibrated by appropriate signals. Upon being measured or detected by instrumentation amplifier 28, the analog signal is filtered by anti-aliasing filter 30, properly amplified and buffered, and fed to A/D converter section 16. There, the analog signal is converted to a digital signal and fed to memory section 20 where the appropriate location to store the incoming data is selected by processing control section 14. As was discussed previously, only approximately 97% of the memory is allocated to store incoming data. And when the HDAS has been triggered, only 90% of the allocated memory is used to store the incoming data, with the remaining 10% of the allocated memory storing data that occurred prior to the trigger command. The earlier stored data is important since it is used to reconstruct what occurred prior to the trigger and is especially important if the HDAS is triggered by means of its internal acceleration sensitive switch. After storage, upon retrieval, the data recorded in the HDAS may be downloaded to an external equipment, via interface section 22.

Inasmuch as the present invention is subject to many variation, modifications and changes in detail, it is intended that all matter throughout this specification and shown in the accompanying drawings be interpreted as illustrative only and not in a limiting sense. Accordingly, it is intended that the invention be limited only by the spirit and scope of the appended claims.

I claim:

1. A self contained data acquisition apparatus, comprising:
   a. at least one transducer means for detecting shock levels effected by an explosive source;
   b. signal conditioning means for obtaining an analog signal representative of the detected shock levels from said transducer means;
   c. means for converting the analog signal to a corresponding digital signal;
   d. memory means for storing the digital signal as data;
   e. processing means for controlling the operation of at least said signal conditioning, converting and memory means;
   f. container means for enclosing in a given space at least said signal means, converting, memory and processing means;
   g. means for encapsulating at least said signal conditioning, converting, memory and processing means; and
   h. means within the container means for at least shock isolationally enveloping said signal conditioning, converting, memory and processing means; wherein said container means and said enveloping and encapsulating means substantially prevent shock forces caused by said explosive source, as well as electrical and magnetic effects outside said container means, from adversely affecting said signal conditioning, converting, memory and processing means.

2. The apparatus according to claim 1, further comprising power means for supplying power to said signal conditioning, converting, memory and processing means; wherein said power means is enclosed in the given space of said container means and is encapsulated and shock isolationally enveloped by said encapsulating and enveloping means, respectively.

3. The apparatus according to claim 1, further comprising:
   a. interface means electrically connected to at least said control and memory means for providing interfacing between said apparatus and external equipment;
   b. wherein the data stored in said memory means can be downloaded by said external equipment; and
   c. wherein said external equipment can provide signals to at least calibrate and test said apparatus.

4. The apparatus according to claim 1, further comprising switch means situated within the given space of said container means, and electrically connected to said processing means, for automatically triggering said memory means to store the signal representative of the detected shock levels when a predetermined shock level is reached.

5. The apparatus according to claim 1, further comprising optical means situated within the given space of said container means for isolating said apparatus from faulty ground signals transmitted thereto, thereby ensuring that said apparatus operates independently of other data acquisition apparatus.

6. The apparatus according to claim 1,
   a. wherein said memory means, once initiated, begins to store data in a wrap-around mode whereby, once said memory means is full, the oldest data in said memory means is continuously being replaced by the newest data; and
   b. wherein said memory means, once triggered to accept the data representative of said detected shock levels, begins to store said detected shock levels data until a predefined substantial portion of said memory means contains said detected shock levels data and a predefined portion of said memory means contains data stored prior to said memory means being triggered to accept said detected shock levels data.

7. The apparatus according to claim 1, wherein said signal conditioning means comprises:
   a. first amplifier means for receiving the analog signal; filter means for filtering from the analog signal frequencies above a chosen predetermined upper limit; and
   b. second amplifier means for amplifying the filtered analog signal.

8. The apparatus according to claim 1, wherein said converting means comprises a flash type analog to digital converter for converting the analog signal t the digital signal.

9. The apparatus according to claim 1, wherein said processing means comprises:
   a. first circuit means for providing different commands to said memory means; and
   b. second circuit means for addressing and selecting particular portions of said memory means to store data representative of said detected shock levels.

10. The apparatus according to claim 9, wherein said first circuit means comprise:
    a. a timer circuit for providing timing to said processing means;
    b. an initiating circuit for initiating said memory means to begin storing data in a wrap-around mode; and
    c. a trigger circuit for triggering said memory means to store data representative of said detected shock level until a predefined substantial portion of said memory means contains said detected shock level data.

11. The apparatus according to claim 1, wherein said encapsulating means comprises STYCAST.

12. The apparatus according to claim 1, wherein said enveloping means comprises silicon micro-balloon particles.

13. The apparatus according to claim 1, wherein said converting means and said processing means are packaged in plastic.

14. A self contained data acquisition apparatus to be carried by a projectile, comprising:
   a. at least one transducer means for detecting impact levels encountered by said projectile from the time it is launched to when it lands;
   b. signal conditioning means for obtaining an analog signal representative of the detected impact levels from said transducer means;
   c. means for converting the analog signal to a corresponding digital signal;
   d. memory means for storing the digital signal as data; processing means for controlling the operation of said signal conditioning, converting and memory means;
   e. container means for enclosing in a given space at least said signal conditioning, converting, memory and processing means;
   f. means for encapsulating at least said signal conditioning, converting, memory and processing means; and
   g. means within the container means for shock isolationally enveloping at least said signal conditioning, converting, memory and processing means;
   h. wherein said container means and said enveloping and encapsulating means substantially prevent shock forces caused by impacts encountered by said projectile, as well as electrical and magnetic effects outside said container means, from adversely affecting said signal conditioning, converting, memory and processing means.

15. The apparatus according to claim 14, further comprising:
   a. power means for supplying power to said signal conditioning, converting, memory and processing means; and
   b. wherein said power means is enclosed in the given space of said container means and is encapsulated and shock isolationally enveloped by said encapsulating and enveloping means, respectively.

16. The apparatus according to claim 14, further comprising:
   a. interface means electrically connected to at least said control and memory means for providing interfacing between said apparatus and external equipment;
   b. wherein the data stored in said memory means can be downloaded by said external equipment; and
   c. wherein said external equipment can provide signals to at least calibrate and test said apparatus.

17. The apparatus according to claim 14, further comprising switch means situated within the given space of said container means, and electrically connected to said processing means, for automatically triggering said memory means to store the signal representative of the detected shock levels when a predetermined shock level is reached.

18. The apparatus according to claim 14, wherein said memory means, once initiated, begins to store data in a wrap-around mode whereby, once said memory means is full, the oldest data in said memory means is continuously being replaced by the newest data; and wherein said memory means, once triggered to accept the data representative of said detected shock levels, begins to store said detected shock levels data until a predefined substantial portion of said memory means contains said detected shock levels data and a predefined small portion of said memory means contains data stored prior to said memory means being triggered to accept said detected shock levels data.

19. The apparatus according to claim 14, wherein said signal conditioning means comprises:
   a. first amplifier means for receiving the analog signal;
   b. filter means for filtering from the analog signal frequencies above a chosen predetermined upper limit; and
   c. second amplifier means for amplifying the filtered analog signal.

20. The apparatus according to claim 14, wherein said converting means comprises a flash type analog to digital converter for converting the analog signal to the digital signal.

21. The apparatus according to claim 14, wherein said processing means comprises:
   a. first circuit means for providing different commands to said memory means; and
   b. second circuit means for addressing and selecting particular portions of said memory means to store data representative of said detected shock levels.

22. The apparatus according to claim 14, wherein said first circuit means comprise:
   a. a timer circuit for providing timing to said processing means;
   b. an initiating circuit for initiating said memory means to begin storing data in a wrap-around mode; and
   c. a trigger circuit for triggering said memory means to store data representative of said detected shock level until a predefined substantial portion of said memory means contains said detected shock level data.

23. The apparatus according to claim 14, wherein said encapsulating means comprises STYCAST.

24. The apparatus according to claim 14, wherein said enveloping means comprises silicon micro-balloon particles.

25. The apparatus according to claim 1, wherein said converting means and said processing means are packaged in plastic.

26. The apparatus according to claim 14, wherein said container means comprises a canister to be inserted in said projectile.

27. A self contained data acquisition apparatus to be carried by a projectile, comprising:
   a. at least one transducer means for detecting motions of said projectile during flight;
   b. signal conditioning means for obtaining an analog signal representative of the detected motions from said transducer means;
   c. means for converting the analog signal to a corresponding digital signal;
   d. memory means for storing the digital signal as data;
   e. processing means for controlling the operation of at least said signal conditioning, converting and memory means;

f. container means for enclosing in a given space at least said signal conditioning, converting, memory and processing means;

g. means for encapsulating at least said signal conditioning, converting, memory and processing means; and h. means within the container means for at least shock isolationally enveloping said signal conditioning, converting, memory and processing means;

wherein said container means and said enveloping and encapsulating means substantially prevent forces encountered by said projectile during flight, as well as electrical and magnetic effects outside said container means, from adversely affecting said signal conditioning, converting, memory and processing means.

28. The apparatus according to claim 27, further comprising:
   a. power means for supplying power to said signal conditioning, converting, memory and processing means;
   b. wherein said power means is enclosed in the given space of said container means and is encapsulated and shock isolationally enveloped by said encapsulating and enveloping means, respectively.

29. The apparatus according to claim 27, further comprising:
   a. interface means electrically connected to at least said control and memory means for providing interfacing between said apparatus and external equipment;
   b. wherein the data stored in said memory means can be downloaded by said external equipment; and
   c. wherein said external equipment can provide signals to at least calibrate and test said apparatus.

30. The apparatus according to claim 27, further comprising switch means situated within the given space of said container means, and electrically connected to said processing means, for automatically triggering said memory means to store the signal representative of the detected shock levels when a predetermined shock level is reached.

31. The apparatus according to claim 27, wherein said memory means, once initiated, begins to store data in a wrap-around mode whereby, once said memory means is full, the oldest data in said memory means is continuously being replaced by the newest data; and wherein said memory means, once triggered to accept the data representative of said detected shock levels, begins to store said detected shock levels data until a predefined substantial portion of said memory means contains said detected shock levels data and a predefined small portion of said memory means contains data stored prior to said memory means being triggered to accept said detected shock levels data.

32. The apparatus according to claim 27 wherein said signal conditioning means comprises:
   a. first amplifier means for receiving the analog signal;
   b. filter means for filtering from the analog signal frequencies above a chosen predetermined upper limit; and
   c. second amplifier means for amplifying the filtered analog signal.

33. The apparatus according to claim 27, wherein said converting means comprises a flash type analog to digital converter for converting the analog signal to the digital signal.

34. The apparatus according to claim 27, wherein said processing means comprises:
   a. first circuit means for providing different commands to said memory means; and
   b. second circuit means for addressing and selecting particular portions of said memory means to store data representative of said detected shock levels.

35. The apparatus according to claim 27, wherein said first circuit means comprise:
   a. a timer circuit for providing timing to said processing means;
   b. an initiating circuit for initiating said memory means to begin storing data in a wrap-around mode; and
   c. a trigger circuit for triggering said memory means to store data representative of said detected shock level until a predefined substantial portion of said memory means contains said detected shock level data.

36. The apparatus according to claim 27, wherein said encapsulating means comprises STYCAST.

37. The apparatus according to claim 27, wherein said enveloping means comprises silicon micro-balloon particles.

38. The apparatus according to claim 27, wherein said transducer means comprises an accelerometer for measuring the acceleration of said projectile.

* * * * *